Sept. 15, 1970     E. H. E. MARTIN ET AL     3,528,457
HOSE
Filed Aug. 1, 1968

INVENTORS
ERWIN H. E. MARTIN
CLIVE S. THAWLEY

BY *Stevens, Davis, Miller & Mosher*
ATTORNEYS

United States Patent Office 3,528,457
Patented Sept. 15, 1970

3,528,457
HOSE
Erwin Herbert Erland Martin, Coventry, and Clive S. Thawley, Hayling Island, England, assignors to The Dunlop Company Limited, London, England, a British company
Filed Aug. 1, 1968, Ser. No. 749,360
Claims priority, application Great Britain, Aug. 11, 1967, 36,901/67
Int. Cl. F16l *11/08*
U.S. Cl. 138—132         11 Claims

ABSTRACT OF THE DISCLOSURE

A hose consisting of an inner layer of an elastomeric composition, a layer of longitudinal fibres adjacent to said inner layer, an intermediate layer of an elastomeric composition adjacent to said layer of longitudinal fibres, at least one layer of transverse fibres adjacent to said intermediate layer, and an outer layer of an elastomeric composition adjacent to said layer of transverse fibres, each layer of an elastomeric composition being based on a thermoplastic poly(vinyl chloride), polyurethane, ethylene/vinyl acetate copolymer or block copolymer of which the following is a specification.

---

Figure 1:
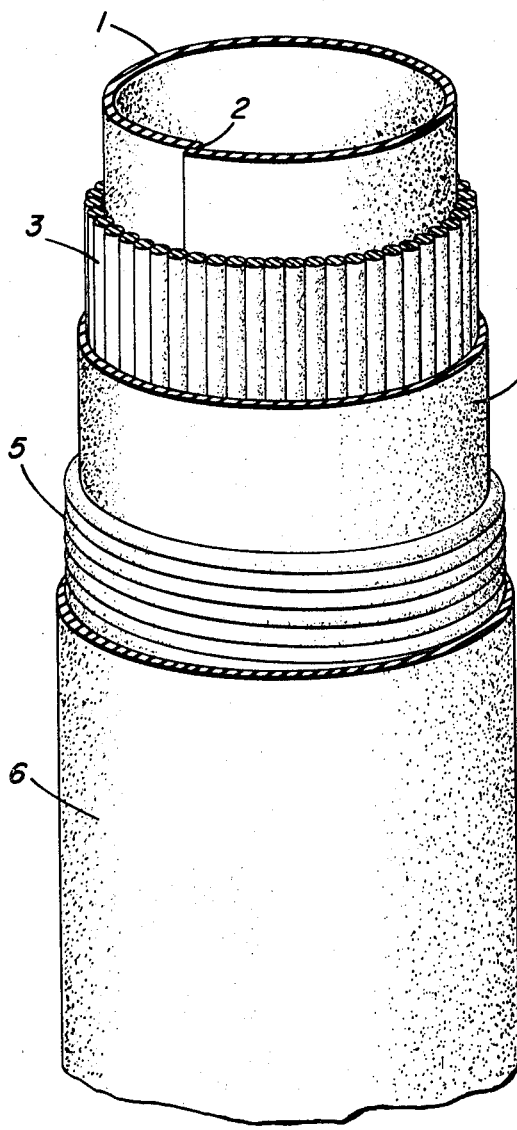

This invention relates to a hose.

According to the present invention a hose comprises an inner layer of an elastomeric composition, a layer of longitudinal fibres adjacent to said inner layer, an intermediate layer of an elastomeric composition adjacent to said layer of longitudinal fibres, at least one layer of transverse fibres (as hereinafter defined) adjacent to said intermediate layer, and an outer layer of an elastomeric composition adjacent to said layer of transverse fibres, each layer of an elastomeric composition being based on a thermoplastic poly(vinyl chloride), polyurethane, ethylene/vinyl acetate copolymer or block copolymer.

In the hose of the present invention the longitudinal fibres are substantially parallel to the longitudinal axis of the finished hose. The term "transverse fibres" means a fibre or fibres crossing the longitudinal fibres within the finished hose.

In the hose of the present invention it is preferred that all of the layers of elastomeric composition are of the same material and it is especially preferred that all layers are of a polyurethane or poly(vinyl chloride) composition.

Preferably the elastomeric composition(s) are derived from a poly(vinyl chloride) plastisol,, or a soft polyurethane, for example, those commercially available as "Estanes" or a polyurethane composition in a solvent, for example, that commercially available as "Impranil."

The hose of the present invention is particularly suitable for use as fire hose. The hose may be used for other purposes, for example, as bunkering hose, and in such use it is preferred that the inner layer should be of polyurethane since this is more resistant to attack by solvents etc., than is poly(vinyl chloride).

An additional inner layer of, for example, a polymer or copolymer of ethylene may be provided for special purposes if the hose is required to carry particularly corrosive materials.

The desired qualities of strength and flexibility regulate particular fibres used in the layers of longitudinal and transverse fibres. The fibres should have a minimum elongation compatible with prevention of kinking of the hose during bending whilst the hose is under pressure. Any fibres having suitable properties may be used, for example, fibres of nylon, poly(ethylene terephthalate), glass, polypropylene. Alternatively, the fibres may be single strand steel wire or steel cord. It is preferred, however, that both longitudinal and transverse fibres are of nylon. The fibres are generally of continuous filaments (as opposed to staple fibres) and they may be in the form of single or multi-filament yarns, or cords.

It is preferred that the transverse fibres are spirally wound within the hose. The transverse fibres may cross the longitudinal fibres at a bias angle of from 54°44' to 90°. Preferably, however, the bias angle of the transverse fibres is from 88° to 90° since if the bias angle is outside these limits then the hose begins to become unbalanced and will tend to twist on pressurization. The unbalance may be corrected by the addition of a second layer of transverse fibres having a bias angle equal but opposite to the bias angle of the first layer of transverse fibres but the addition of a second layer of transverse fibres is accompanied by a reduction of flexibility and lightness of the hose. If two or more layers of transverse fibres are utilized in the hose an intermediate layer of elastomeric composition is provided between adjacent layers of transverse fibres.

The spacing of the fibres may be regulated and, of course, the more widely spaced the fibres in each layer, the greater the flexibility of the hose but the lower its strength. The spacing of the transverse fibres depends also on the desired bias angle of these fibres.

As an example, for a 3 inch diameter fire hose suitable longitudinal fibres are nylon cords with a tensile strength of 42 lb./cord with 18 cords per inch, and suitable transverse fibres consists of a single helically wound nylon cord with a tensile strength of 65 lb./cord with 22 turns per inch, the bias angle of the transverse fibres with respect to the longitudinal fibres being substantially 90°.

The elongation of these fibres should be the minimum compatible with the pressurized hose being able to bend round a 3 ft. radius without kinking and in this particular case a suitable elongation is 4 percent when the hose is under 8 atmospheres working pressure.

It is important in the hose of the present invention that the fibres in both longitudinal and transverse layers should be securely adhered to the elastomeric composition with which they are in contact or otherwise the hose will tend to delaminate when under pressure. This adhesion may be secured by treating the fibres and/or the elastomeric composition with a bonding agent during production of the hose.

The depth of elastomeric composition between the layer of transverse fibres and the layer of longitudinal fibres and between adjacent layers of transverse fibres is preferably the minimum necessary to prevent chafing between the two layers of fibres since as the depth of this elastomeric composition increases the flexibility of the hose is reduced.

The hose of the present invention may be manufactured by either intermittent methods or continuous methods and any suitable method may be used. A method which is particularly suited to the production of the hose of the present invention is that described in our co-pending U.S. application Ser. No. 749,437 filed Aug. 1, 1968.

The invention is illustrated in the accompanying drawing.

Figure 2:
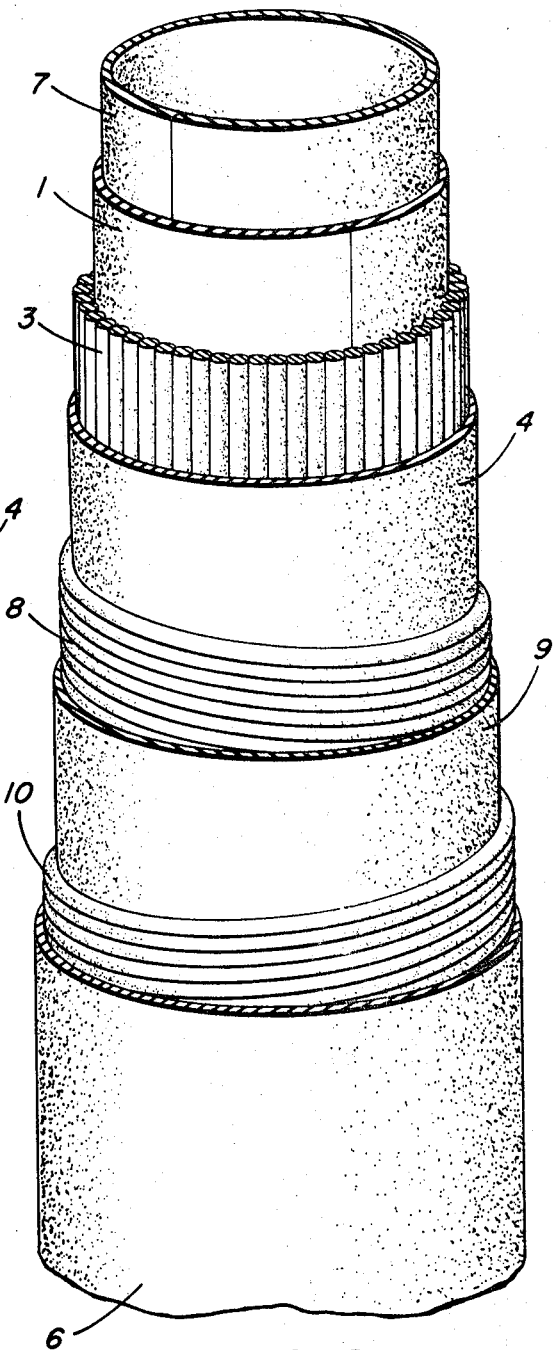

The invention will now be described, by way of example only, with reference to the accompanying drawing which in FIG. 1 is a perspective view of a short length of hose and FIG. 2 is an alternative embodiment thereof.

As shown the hose consists of an inner layer of elastomeric composition 1 having a welded seam 2. A layer of longitudinal fibres 3 is on the outer surface of the inner layer 1, the longitudinal fibres being substantially parallel with the longitudinal axis of the hose.

An intermediate layer of elastomer 4 is provided on the layers of longitudinal fibes 3 and serves to prevent contact between the longitudinal fibres and a layer of transverse fibres 5. The layer of transverse fibres 5 consists of a single helically wound strand which crosses the longitudinal fibres at substantially 90°.

The layer of transverse fibres 5 is covered by an abrasion resistant outer coating 6.

In FIG. 2 an additional inner layer is designated by numeral 7. Two layers of transverse fibers having equal and opposite bias angles are 8 and 10 and the elastomeric layer between them is numeral 9. The remaining reference numerals correspond to those of FIG. 1.

It should be appreciated that although the respective layers of elastomeric composition are shown as distinct strata in the drawings this is done for simplicity only and in the actual hose there is no such clear distinction.

Having now described our invention, what we claim is:

1. A flexible hose comprising an inner layer of an elastomeric composition, a layer of longitudinal fibres adjacent to said inner layer and adhered thereto, an intermediate layer of an elastomeric composition adjacent to said layer of longitudinal fibres and adhered thereto, at least one helically wound layer of transverse fibres adjacent to said intermediate layer and adhered thereto and an outer layer of an elastomeric composition adjacent to said layer of transverse fibres and adhered thereto, each layer of an elastomeric composition being based on a thermoplastic material selected from the group consisting of poly(vinyl chlorides)s, polyurethanes, ethylene/vinyl acetate copolymers, and thermoplastic block copolymers.

2. A hose according to claim 1 in which all the layers of elastomeric composition are of a polyurethane or poly(vinyl chloride) composition.

3. A hose according to claim 1 in which all the layers of elastomeric composition are of the same material.

4. A hose according to claim 3 in which all the layers of elastomeric composition are derived from a poly(vinyl chloride) plastisol.

5. A hose according to claim 1 in which an additional inner layer is provided.

6. A hose according to claim 5 in which the additional inner layer is a polymer or copolymer of ethylene.

7. A hose according to claim 1 in which the longitudinal and transverse fibres are of nylon.

8. A hose according to claim 1 in which there is one layer of transverse fibres.

9. A hose according to claim 8 in which the layer of transverse fibres consists of a single strand.

10. A hose according to claim 8 in which the transverse fibres cross the longitudinal fibres at a bias angle of from 88° to 90°.

11. A hose according to claim 1 in which there are two layers of transverse fibres having equal and opposite bias angles and between said two layers a further intermediate layer of elastomeric composition.

References Cited

UNITED STATES PATENTS

| | | | |
|---|---|---|---|
| 2,482,702 | 9/1949 | Billmeyer | 138—130 XR |
| 2,515,929 | 7/1950 | Ofeldt | 138—138 XR |
| 2,690,769 | 10/1954 | Brown | 138—126 XR |
| 3,002,534 | 10/1961 | Noland | 138—141 |
| 3,407,101 | 10/1968 | Lockshaw | 138—140 XR |

FOREIGN PATENTS 594,377   8/1957   Canada.

LAVERNE D. GEIGER, Primary Examiner

R. J. SHER, Assistant Examiner

U.S. Cl. X.R.

138—137, 141, 144